United States Patent [19] [11] 4,345,376
Benson et al. [45] Aug. 24, 1982

[54] CUTTER FOR THICK WALL PLASTIC PIPE

[75] Inventors: Albert R. Benson; James F. Willats, both of Erie, Pa.

[73] Assignee: Reed Manufacturing Company, Erie, Pa.

[21] Appl. No.: 94,675

[22] Filed: Nov. 15, 1979

[51] Int. Cl.³ .............................................. B23D 21/06
[52] U.S. Cl. .......................................... 30/96; 30/102
[58] Field of Search ....................... 30/94, 95, 96, 101, 30/102, 93; 269/181, 182; 81/136

[56] References Cited

U.S. PATENT DOCUMENTS

| 3,022,575 | 2/1962 | Wright | 30/102 |
| 3,100,934 | 8/1963 | Jonasson | 30/102 |
| 3,117,375 | 1/1964 | Meese | 30/101 |
| 3,145,469 | 8/1964 | Petersen | 30/102 |
| 3,520,527 | 7/1970 | Persson | 269/182 X |
| 3,858,868 | 1/1975 | Zagray | 269/182 X |
| 4,114,485 | 9/1978 | Coblitz et al. | 30/95 |

Primary Examiner—Jimmy C. Peters
Assistant Examiner—J. T. Zatarga
Attorney, Agent, or Firm—Ralph Hammar

[57] ABSTRACT

A cutter having a tubular slide of circular cross section concentric with a pressure screw and guided by a pawl pivoted in a slot in the cutter frame and extending through a longitudinal slot in the slide into engagement with the pressure screw.

10 Claims, 5 Drawing Figures

CUTTER FOR THICK WALL PLASTIC PIPE

This invention is a tubing cutter for thick wall plastic pipe and the like having a tubular slide of circular cross section guided for movement in a plane perpendicular to the longitudinal axis of the pipe by a pawl pivoted in a slot in the cutter frame and extending into a slot in the slide. Precise adjustment of the slide is effected by set screws engaging opposite sides of the pawl. By tightening one of the screws and loosening the other it is possible to shift the axis of the slide enough to bring it into coincidence with a plane perpendicular to the axis of the pipe. This is important in reducing the side thrust on the cutting elements which do not contribute to the cutting action. The cutter accordingly is easier to use.

In the drawing

Figure 1:
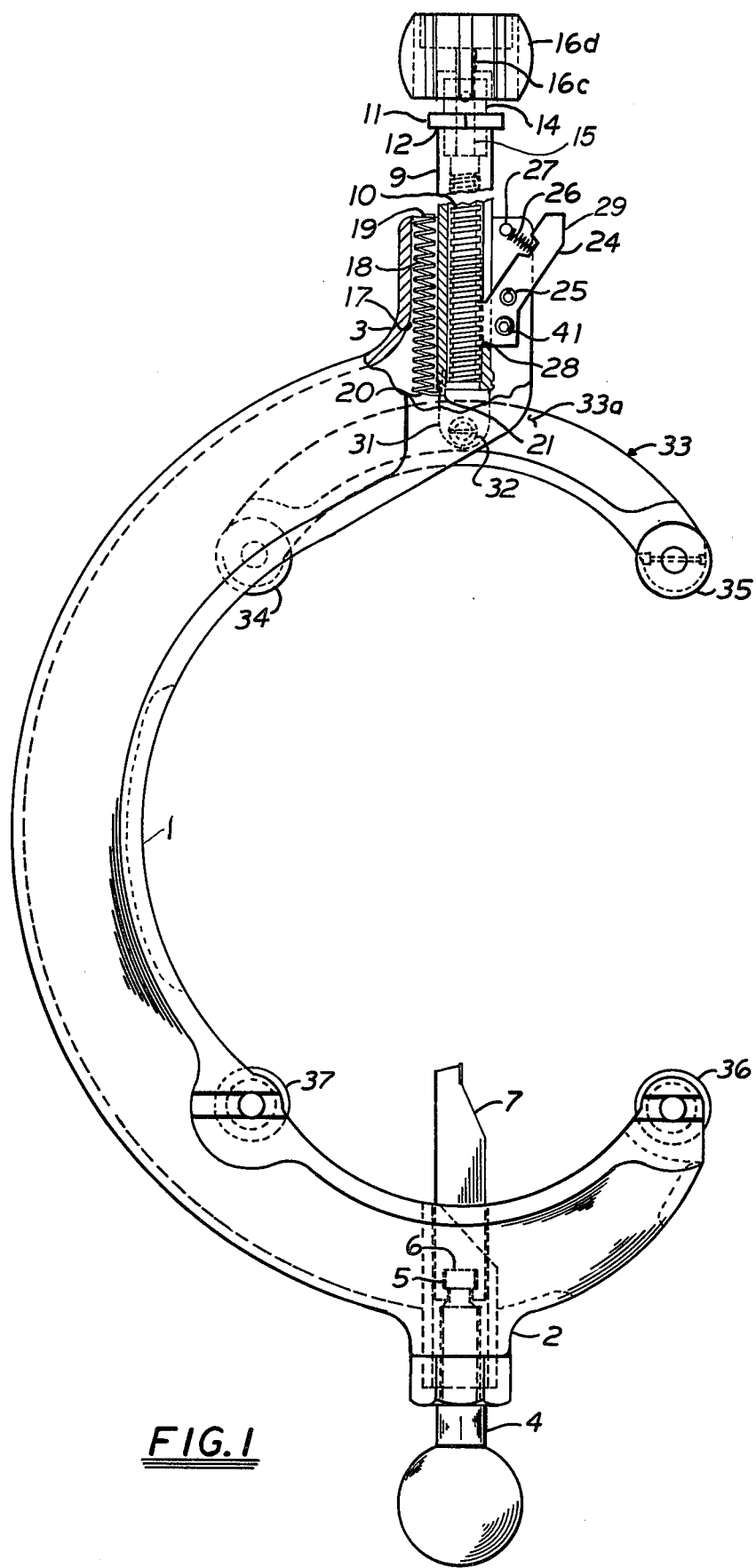
FIG. 1 is an elevation of a pipe cutter set up for using a blade for cutting the pipe.

In a preferred form, the pipe cutter has a C-shaped frame 1 of channel cross section with diametrically opposed hubs 2, 3 centered on an axis through the center of the pipe to be cut. In the hub 2 is a pressure screw 4 having a head 5 at its inner end received in a T slot 6 in a cutter blade 7. The cutter blade is shown in its innermost position, much further inward than it would be during normal cutting. This blade is well known in the art and need not be further illustrated.

In the hub 3 is a bore 8 slidably receiving a tubular slide or carriage 9 of circular cross section. The slide receives a pressure screw 10 which is in push or pull thrust relation to the slide through a hex head bushing 11 screwed into the outer end 12 of the slide and a collar 14 fixed to a reduced section 15 of the screw by a pin 16. The outer end 16a of the screw has outstanding ribs 16b received in a mating socket 16c in a knob 16d for turning the screw. Other structure for establishing a push or pull thrust relation between the screw and carriage may be used.

At the left-hand side of the bore 8 (as viewed in FIG. 1) is a groove 17 for a coil tension spring 18 having one end 19 hooked into the outer end of the hub 3 and having the other end 20 hooked into the inner end 21 of the slide 9. The slide is shown in FIG. 1 in its outermost position with the spring 18 fully contracted. As the slide is moved radially inward, the spring is stretched, developing a tension tending to return the spring toward the FIG. 1 position.

In the upper side of the slide 9 (as viewed in FIG. 4) is a longitudinally extending slot 22 which registers with a slot 23 in the hub. In the slot 23 is a pawl 24 pivoted on a pin 25 extending across the slot. A compression spring 26 exerts a force from pin 27 to pawl 24 biasing the pawl in a clockwise direction as viewed in FIG. 1, so that the inner end 28 which is theaded to match the threads in the pressure screw 10 engages the pressure screw and serves as a nut. By counter-clockwise pressure on the upper end 29 of the pawl, the threaded end 28 of the pawl may be disengaged from the pressure screw 10, but the end 28 of the pawl will always remain in the slot 22 in the slide. The pawl 24 cooperates with the slots 22, 23 to key the slide 9 to the hub 3.

Figure 2:
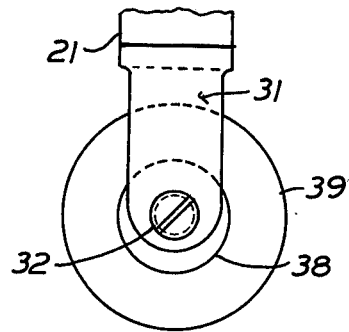
FIG. 2 is a detail showing a cutting wheel substituted for the guide bar of the FIG. 1 cutter.
Figure 3:
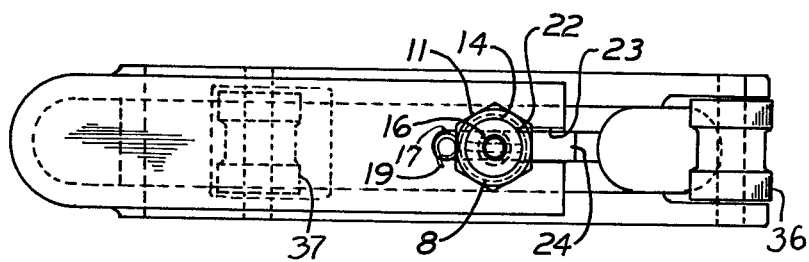
FIG. 3 is an end view of the FIG. 1 cutter with the pressure screw knob removed.
Figure 4:
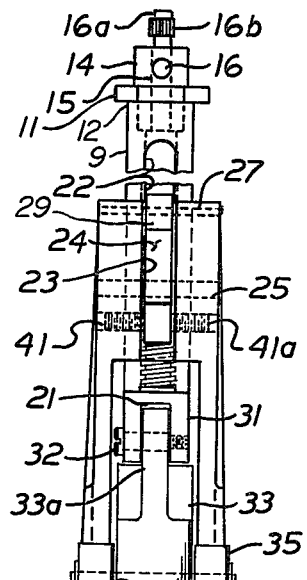
FIG. 4 is a top view of FIG. 3.
Figure 4:
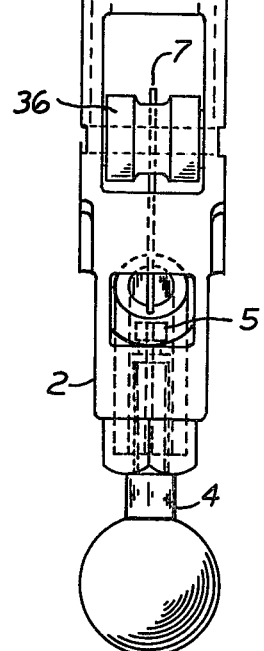

The inner end 21 of the slide is machined to provide spaced upstanding supports 31 between which extend a pivot pin 32. When the cutter is to be used with the cutting blade 7, the tongue 33a of an arcuate bar 33 is mounted on the pin 32 between the supports 31 (FIG. 4). At the outer ends of the bar 33 are mounted guide rollers 34, 35. These rollers cooperate with similar rollers 36, 37 mounted on the frame 1 on opposite sides of the cutter blade 7. When the cutter is to be used with a cutting wheel, the bar 33 is removed and the hub 38 of a cutting wheel 39 is mounted on the pin 32 (FIG. 2).

It is important that the cutter blade 7 be supported in a plane perpendicular to the axis of the pipe being cut. This support comes from the rollers 34, 35, 36, and 37, which ride on the outer surface of the pipe. The desired accurate support of the blade is not possible if, due to manufacturing tolerances, the axis of the slide 9 is on one side or the other, or if the axis of the slide 9 does not coincide with the axis of the blade 7. In order to adjust the axis of the slide 9, set screws 41 and 41a are provided respectively having a flat end engaging opposite sides of the pawl 24. By means of these set screws the axis of the slide 9 may be shifted to one side or the other in order to bring it precisely into coincidence with a plane perpendicular to the axis of the pipe. The set screw adjustment is a factory adjustment. When accurately made, it eliminates side thrust on either the cutting wheel 39 or on the cutter blade 7. When so adjusted, the cutter blade naturally tracks in a previously made cut and the cutter is easier to operate. The same alignment remains when a cutter wheel 39 is substituted for the wheel support bar.

The cutter may be used with either the cutting blade 7 or with the cutting wheel 39, the choice being dictated by the type of plastic pipe. To open the cutter to receive a pipe, the outer end 29 of the pawl is depressed to move the threaded end 28 clear of the pressure screw 10. This permits outward movement of the slide 9 so the cutter can be positioned on a pipe with the pipe cradled in rolls at the point where it is to be cut. The cutter is closed against the pipe by pressing inward on the knob 16d while holding the rolls 36, 37 in contact with the pipe. The inward force of the threads of screw 10 on the threaded end 28 of the pawl is in the direction to rotate the pawl about pin 25 in a counterclockwise direction (as viewed in FIG. 1) and thereby move the threaded end of the pawl clear the screw 10. This brings either rolls 34, 35 or cutting wheel 39 into contact with the side of the pipe opposite rolls 36, 37 and results in supporting the cutter accurately in a plane perpendicular to the axis of the pipe. This results in tracking of the cuts made by the wheel 39 or blade 7.

Figure 5:
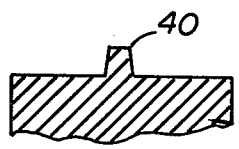
FIG. 5 is a detail of the tread of a guide roller.

FIG. 5 shows a wedge shaped tread on the roll 36 in front of the blade 7 which tracks in the cut made by blade and also spreads the sides of the cut to make the cutting easier. The tread 40 has a flat top wider than the cut made by the wheel 39 so that when cutting with the wheel the tread rides on the outer surface of the pipe.

We claim:

1. A pipe cutter comprising a frame rotatable relative to a pipe being cut in a plane perpendicular to the axis of the pipe, said frame having a way for a tubular carriage of circular cross section movable toward and away from the axis of the pipe, a screw in thrust relation to said tube, a slot in the frame registering with an elongated slot in said carriage, and an element received in said slots having a threaded portion engaged with said screw for keying the carriage to the frame and for establishing a screw drive to the carriage.

2. The structure of claim 1 plus a tension spring received in a groove in said way and having one end remote from said axis and in thrust relation to said frame and the other end in thrust relation to said carriage.

3. The structure of claim 1 in which said element is a pawl mounted on said frame with said threaded portion at one end of the pawl and movable into and out of engagement with said screw.

4. The structure of claim 1 plus set screws in said frame having inner ends engaging said element to position said carriage relative to said plane.

5. The structure of claim 1 in which the inner end of said carriage carries an arcuate bar with pipe engaging rolls journaled therein.

6. The structure of claim 1 in which the inner end of said carriage has a pipe engaging cutter wheel journaled therein.

7. The structure of claim 5 in which a cutter blade is carried on a section of the frame remote from said carriage.

8. The structure of claim 1 in which the thrust relation between the screw and tube is through a bushing fixed to the outer end of the tube.

9. The structure of claim 1 in which the inner end of the carriage and the frame have means for supporting the cutter in a plane perpendicular to the axis of the pipe.

10. The structure of claim 9 in which the supporting means includes a cutting wheel journaled in the inner end of the carriage.

* * * * *